(12) United States Patent
Isoda

(10) Patent No.: US 8,375,419 B2
(45) Date of Patent: Feb. 12, 2013

(54) INFORMATION PROCESSING APPARATUS, METHOD FOR CONTROLLING INFORMATION PROCESSING APPARATUS, AND STORAGE MEDIUM

(75) Inventor: Takashi Isoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 902 days.

(21) Appl. No.: 12/204,426

(22) Filed: Sep. 4, 2008

(65) Prior Publication Data

US 2009/0064277 A1    Mar. 5, 2009

(30) Foreign Application Priority Data

Sep. 5, 2007    (JP) .................................. 2007-230406

(51) Int. Cl.
*H04L 9/32* (2006.01)
*H04L 9/00* (2006.01)

(52) U.S. Cl. ................. 726/2; 726/1; 713/165; 713/168

(58) Field of Classification Search .................... 726/14, 726/26–28, 1–5; 713/168, 170, 182, 189, 713/165; 380/277
See application file for complete search history.

(56) References Cited

U.S. PATENT DOCUMENTS 5,841,970 A * 11/1998 Tabuki .............................. 726/2
6,189,032 B1 * 2/2001 Susaki et al. .................. 709/225

FOREIGN PATENT DOCUMENTS

| JP | 2003326777 A | 11/2003 |
|---|---|---|
| JP | 2006-164005 A | 6/2006 |

* cited by examiner

*Primary Examiner* — Hosuk Song
(74) *Attorney, Agent, or Firm* — Canon U.S.A., Inc. IP Division

(57) ABSTRACT

A method for controlling an information processing apparatus includes storing identification information to identify a type of authentication information which is necessary to use each of a plurality of files stored in a memory unit from among a plurality of types of authentication information, and causing a display unit to display the plurality of files stored in the memory unit and the stored identification information in association with each other.

13 Claims, 18 Drawing Sheets

FIG.2

| ENCRYPTION SYSTEM | DECRYPTION KEY FORM | DECRYPTION KEY INPUT METHOD |
|---|---|---|
| SYMMETRIC KEY ENCRYPTION SYSTEM | PASSWORD | ENTER CHARACTER, HIDE ENTERED CHARACTER |
| ASYMMETRIC KEY ENCRYPTION SYSTEM | SECRET KEY FILE (EXTENSION p12) | DESIGNATE FILE, ONLY EXTENSION p12 |
| Policy ENCRYPTION SYSTEM | POLICY ACCOUNT | ENTER CHARACTER |
| | PASSWORD | ENTER CHARACTER, HIDE ENTERED CHARACTER |
| ADC ENCRYPTION SYSTEM | E-MAIL ADDRESS | ENTER E-MAIL ADDRESS |
| | PASSWORD | ENTER CHARACTER, HIDE ENTERED CHARACTER |
| OPEN & OPERATION ENCRYPTION SYSTEM | PASSWORD | ENTER CHARACTER, HIDE ENTERED CHARACTER |
| | Operation PASSWORD | ENTER CHARACTER, HIDE ENTERED CHARACTER |
| DOUBLE ENCRYPTION SYSTEM | PASSWORD | ENTER CHARACTER, HIDE ENTERED CHARACTER |
| | SECRET KEY FILE (EXTENSION p12) | DESIGNATE FILE, ONLY EXTENSION p12 |

FIG.4

| FILE IDENTIFIER | DECRYPTION KEY FORM | DECRYPTION KEY INPUT METHOD |
|---|---|---|
| AAAAA.PDF | PASSWORD | DESIGNATE FILE, ONLY EXTENSION p12 |

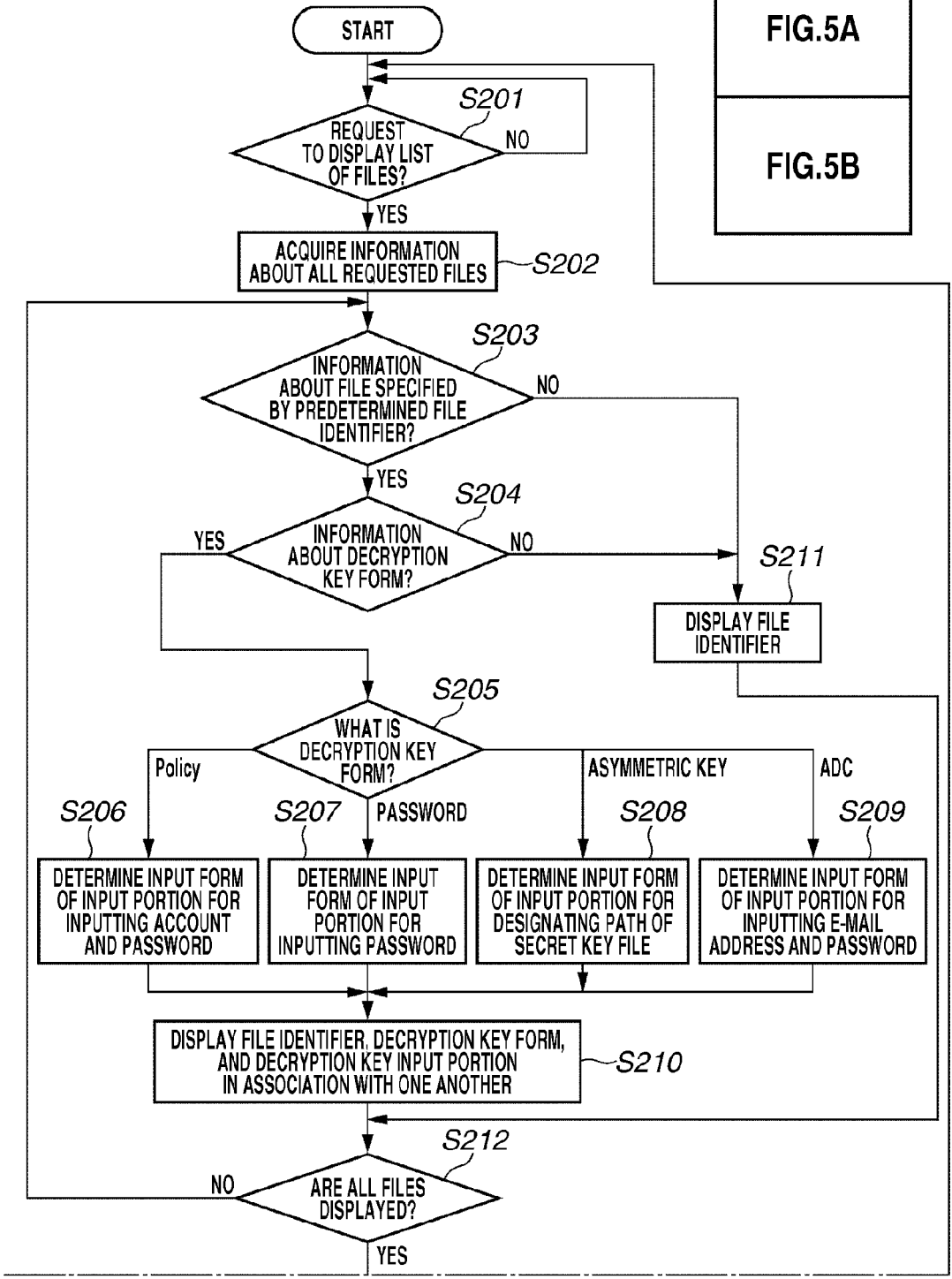

FIG.6

| FILE IDENTIFIER | DECRYPTION KEY FORM | DECRYPTION KEY INPUT METHOD |
|---|---|---|
| AAAAA.PDF | PASSWORD | DESIGNATE FILE, ONLY EXTENSION p12 |
| BBBBB.PDF | POLICY ACCOUNT | ENTER CHARACTER |
| | PASSWORD | ENTER CHARACTER, HIDE ENTERED CHARACTER |
| 11111.jpg | | |
| ccccc.PDF | PASSWORD | ENTER CHARACTER, HIDE ENTERED CHARACTER |
| | Operation PASSWORD | ENTER CHARACTER, HIDE ENTERED CHARACTER |
| 122222.xps | | |
| bbbbcccc.pdf | SECRET KEY FILE (EXTENSION p12) | DESIGNATE FILE, ONLY EXTENSION p12 |
| 333333.tiff | | |
| dddddd.pdf | SECRET KEY FILE (EXTENSION p12) | DESIGNATE FILE, ONLY EXTENSION p12 |
| eeeee.pdf | | |
| 44444.tiff | | |
| ffffff.pdf | E-MAIL ADDRESS | ENTER E-MAIL ADDRESS |
| | PASSWORD | ENTER CHARACTER, HIDE ENTERED CHARACTER |

FIG.7

FILE DISPLAY

| FILE NAME | TYPE | CREATING DATE... | DECRYPTION KEY FORM | DECRYPTION KEY INPUT |
|---|---|---|---|---|
| AAAAAA | PDF | 2006/10/30 | PASSWORD | PASSWORD ●●●● |
| BBBBBB | PDF | 2007/2/21 | Policy ACCOUNT & PASSWORD | ACCOUNT [POLICY]<br>PASSWORD ●●●● |
| 111111 | JPG | 2006/10/22 | | |
| cccccc | PDF | 2006/10/30 | PASSWORD | PASSWORD ●●●● |
| 122222 | Xps | 2006/10/22 | Operation PASSWORD | PASSWORD ●●●● |
| Bbbbcccc | PDF | 2005/10/30 | Certificate p12 FORMAT FILE | REFERENCE ¥¥box¥a¥... ▶ |
| dddddddd | PDF | 2006/10/30 | Certificate p12 FORMAT FILE | REFERENCE c:¥box¥<br>c:¥box¥koko<br>c:¥box¥koko¥...¥abc.p12 |
| 444444 | tiff | 2006/10/22 | | |
| ffffffff | PDF | 2007/2/21 | ADC ACCOUNT & PASSWORD | E-MAIL ADDRESS [Xx] @ [Zz] .com<br>PASSWORD ●●●● |

FIG.8

| FILE NAME | TYPE | CREATING DATE... | DECRYPTION KEY FORM | DECRYPTION KEY INPUT |
|---|---|---|---|---|
| AAAAAA | PDF | 2006/10/30 | PASSWORD | PASSWORD ●●●●● |
| cccccc | PDF | 2005/10/30 | PASSWORD | PASSWORD ●●●●● |
| Bbbbcccc | PDF | 2005/10/30 | Operation PASSWORD | PASSWORD ●●●●● |
| ddddddd | PDF | 2006/10/30 | Certificate p12 FORMAT FILE | REFERENCE ¥¥box¥a¥... ▼<br>REFERENCE c:¥box¥ / c:¥box¥koko / c:¥box¥koko¥...¥abc.p12 |
| BBBBBB | PDF | 2007/2/21 | Policy ACCOUNT & PASSWORD | ACCOUNT<br>POLICY ●●●●● |
| ffffff | PDF | 2007/2/21 | ADC ACCOUNT & PASSWORD | E-MAIL ADDRESS Xx @ Zz .com<br>PASSWORD ●●●●● |
| 111111 | JPG | 2006/10/22 | | |
| 444444 | tiff | 2006/10/22 | | |
| 122222 | Xps | 2006/10/22 | | |

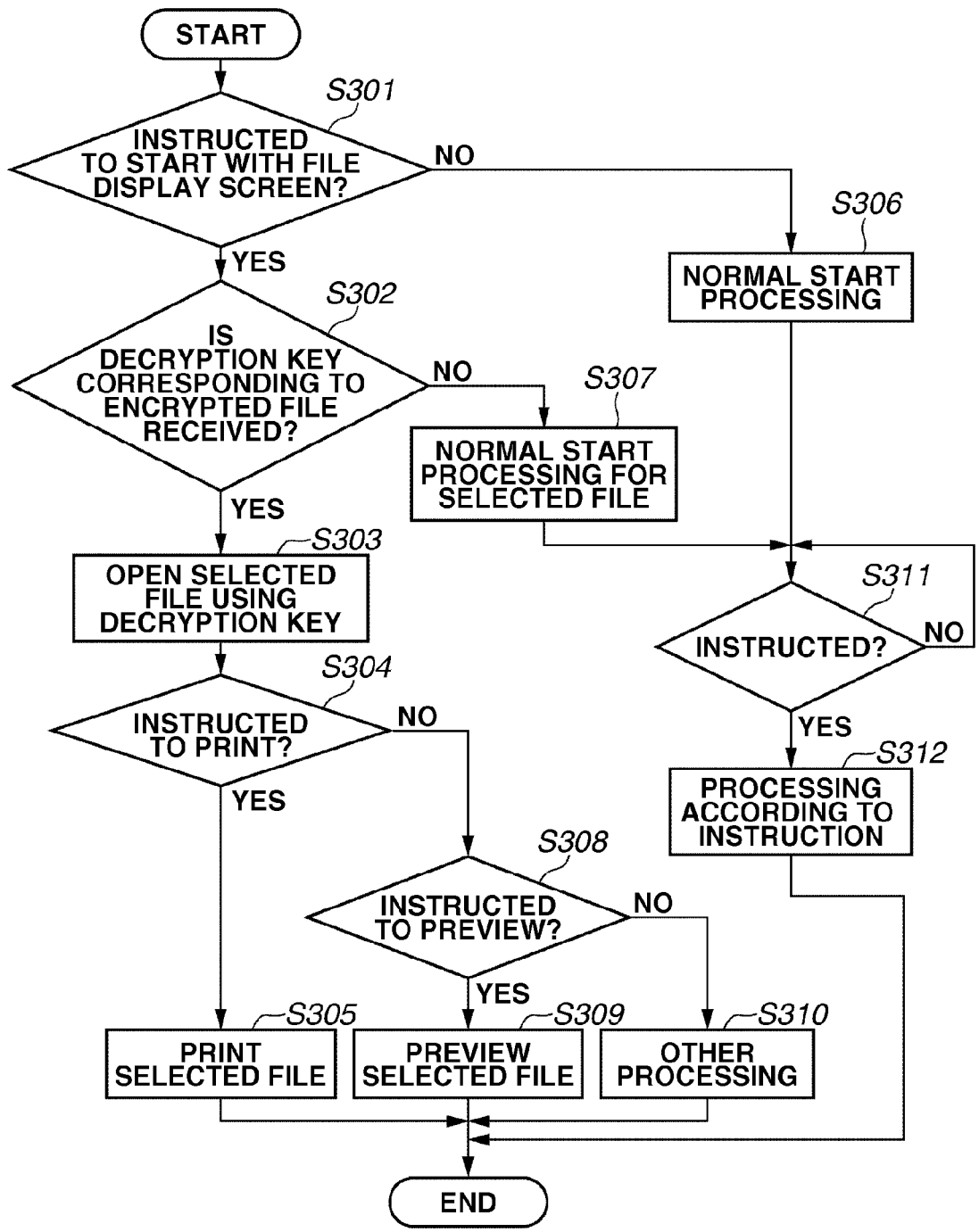

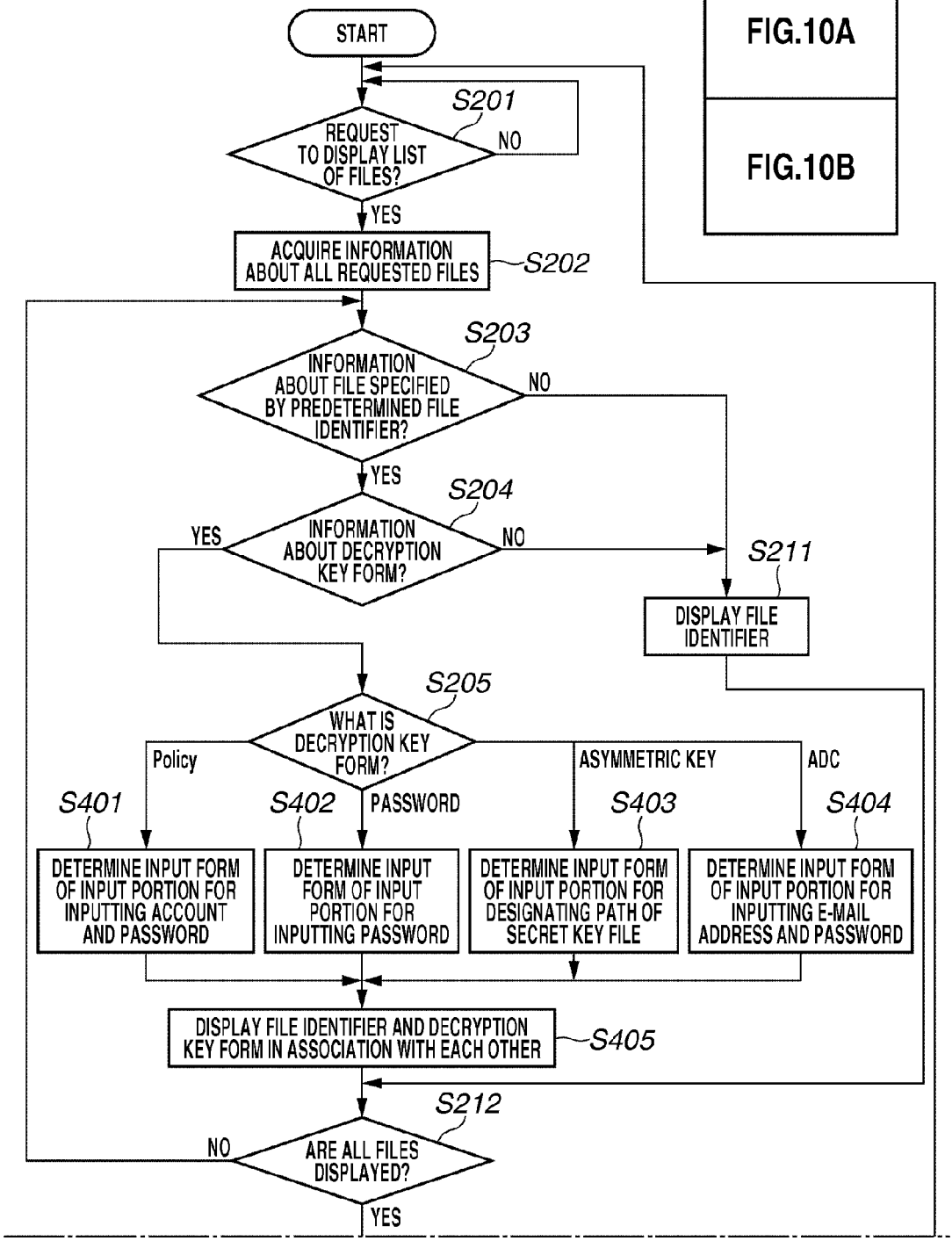

FIG.11

| FILE DISPLAY | | | |
|---|---|---|---|
| FILE NAME | TYPE | CREATING DATE... | DECRYPTION KEY FORM |
| AAAAAA | PDF | 2006/10/30 | PASSWORD |
| BBBBBB | PDF | 2007/2/21 | Policy ACCOUNT & PASSWORD |
| 111111 | JPG | 2006/10/22 | |
| ccccccc | PDF | 2005/10/30 | PASSWORD |
| 122222 | Xps | 2006/10/22 | Operation PASSWORD |
| Bbbbcccc | PDF | 2005/10/30 | Certificate p12 FORMAT FILE |
| dddddddd | PDF | 2006/10/30 | Certificate p12 FORMAT FILE |
| 444444 | tiff | 2006/10/22 | |
| ffffffff | PDF | 2007/2/21 | ADC ACCOUNT & PASSWORD |

FIG.12

```
                    FILE OPEN
─────────────────────────────────────────
AAAAAA.PDF    DECRYPTION        PASSWORD
              KEY FORM
         ENTER
         PASSWORD  [●●●●●]
```

FIG.13

```
                    FILE OPEN
─────────────────────────────────────────
BBBBB.PDF     DECRYPTION       Policy
              KEY FORM         PASSWORD
         ENTER
         ACCOUNT    [ POLICY ]
         ENTER
         PASSWORD   [●●●●●]
```

FIG.14

```
┌─────────────────────────────────────────┐
│              FILE OPEN                  │
├─────────────────────────────────────────┤
│  BBBBB.PDF    DECRYPTION    PASSWORD    │
│               KEY FORM                  │
│      ENTER             ┌───────┐        │
│      PASSWORD          │●●●●●  │        │
│                        └───────┘        │
│      ENTER Operation   ┌───────┐        │
│      PASSWORD          │●●●●●  │        │
│                        └───────┘        │
└─────────────────────────────────────────┘
```

FIG.15

```
┌─────────────────────────────────────────┐
│              FILE OPEN                  │
├─────────────────────────────────────────┤
│  BBBBB.PDF   DECRYPTION    ADC ACCOUNT  │
│              KEY FORM      & PASSWORD   │
│      ENTER E-MAIL  ┌──┐   ┌──┐          │
│      ADDRESS       │Xx│ @ │Zz│ .com     │
│                    └──┘   └──┘          │
│      ENTER           ┌───────┐          │
│      PASSWORD        │●●●●●  │          │
│                      └───────┘          │
└─────────────────────────────────────────┘
```

FIG.17

| FILE NAME | TYPE | CREATING DATE... | DECRYPTION KEY FORM |
|---|---|---|---|
| AAAAAA | PDF | 2006/10/30 | PASSWORD |
| ccccccc | PDF | 2005/10/30 | PASSWORD |
| Bbbbcccc | PDF | 2005/10/30 | Operation PASSWORD Certificate p12 FORMAT FILE |
| dddddddd | PDF | 2006/10/30 | Certificate p12 FORMAT FILE |
| BBBBBB | PDF | 2007/2/21 | Policy ACCOUNT & PASSWORD |
| fffffff | PDF | 2007/2/21 | ADC ACCOUNT & PASSWORD |
| 111111 | JPG | 2006/10/22 | |
| 444444 | tiff | 2006/10/22 | |
| 122222 | Xps | 2006/10/22 | |

FILE DISPLAY

FIG.18

| DIRECTORY INFORMATION |
|---|
| PROGRAM CODE CORRESPONDING TO STEPS OF FLOWCHART ILLUSTRATED IN FIG. 3 |
| PROGRAM CODE CORRESPONDING TO STEPS OF FLOWCHART ILLUSTRATED IN FIG. 5 |
| PROGRAM CODE CORRESPONDING TO STEPS OF FLOWCHART ILLUSTRATED IN FIG. 9 |
| PROGRAM CODE CORRESPONDING TO STEPS OF FLOWCHART ILLUSTRATED IN FIG. 10 |
| |

INFORMATION PROCESSING APPARATUS, METHOD FOR CONTROLLING INFORMATION PROCESSING APPARATUS, AND STORAGE MEDIUM

BACKGROUND OF THE INVENTION

1. Field of the Invention

The present invention relates to an information processing apparatus, a method for controlling an information processing apparatus, and a storage medium.

2. Description of the Related Art

In recent years, files corresponding to various authentication systems have been used according to purposes or applications. A user needs to input various kinds of authentication information according to an authentication system in order to use such files.

For example, if a desired file is a portable document format (PDF) file that is encrypted by a symmetric key encryption method, a user needs to enter a password. Further, if a desired file is a PDF file that is encrypted by an asymmetric key encryption method, a user needs to enter a secret key. If an access to a desired file is limited by a policy server system, a user needs to enter an account and a password to access the file. If a desired file is encrypted by an advanced document center (ADC) service, a user needs to enter an e-mail address and a password.

On the other hand, an information processing apparatus that can display a file list display screen for displaying a list of information about files stored in a hard disk on a display unit is discussed in Japanese Patent Application Laid-Open No. 2006-164005. As for such an information processing apparatus, a user selects any file on the file list display screen displayed on the display unit to activate an application corresponding to the selected file and use the file.

According to the method discussed in Japanese Patent Application Laid-Open No. 2006-164005, however, a user cannot easily determine a type of authentication information necessary to use files corresponding to different types of authentication systems, for each file. To determine a type of authentication information necessary to use a desired file, a user needs to memorize authentication information corresponding to the file or once activate an application corresponding to the file. This operation is troublesome.

SUMMARY OF THE INVENTION

The present invention is directed to an information processing apparatus and a method for controlling the information processing apparatus which allow a user to easily determine a type of authentication information necessary to use files corresponding to various authentication systems.

According to an aspect of the present invention, an information processing apparatus includes a storage unit configured to store identification information to identify a type of authentication information which is necessary to use each of a plurality of files stored in a memory unit from among a plurality of types of authentication information, and a display control unit configured to display the plurality of files stored in the memory unit and the identification information stored in the storage unit on a display unit in association with each other.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates a decryption key form table according to an exemplary embodiment of the present invention.

FIG. 4 illustrates an example of data in a decryption key form table according to an exemplary embodiment of the present invention.

FIGS. 5A and 5B are a flowchart illustrating an example of a control procedure according to an exemplary embodiment of the present invention.

FIG. 6 illustrates a storage information table according to an exemplary embodiment of the present invention.

FIG. 7 illustrates an example of a display screen displayed on a display unit according to an exemplary embodiment of the present invention.

FIG. 8 illustrates an example of a display screen displayed on a display unit according to an exemplary embodiment of the present invention.

FIG. 9 is a flowchart illustrating an example of a control procedure according to an exemplary embodiment of the present invention.

FIGS. 10A and 10B are a flowchart illustrating an example of a control procedure according to an exemplary embodiment of the present invention.

FIG. 11 illustrates an example of a display screen displayed on a display unit according to an exemplary embodiment of the present invention.

FIG. 12 illustrates an example of a display screen displayed on a display unit according to an exemplary embodiment of the present invention.

FIG. 13 illustrates an example of a display screen displayed on a display unit according to an exemplary embodiment of the present invention.

FIG. 14 illustrates an example of a display screen displayed on a display unit according to an exemplary embodiment of the present invention.

FIG. 15 illustrates an example of a display screen displayed on a display unit according to an exemplary embodiment of the present invention.

FIG. 17 illustrates an example of a display screen displayed on a display unit according to an exemplary embodiment of the present invention.

FIG. 18 illustrates a program code according to an exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
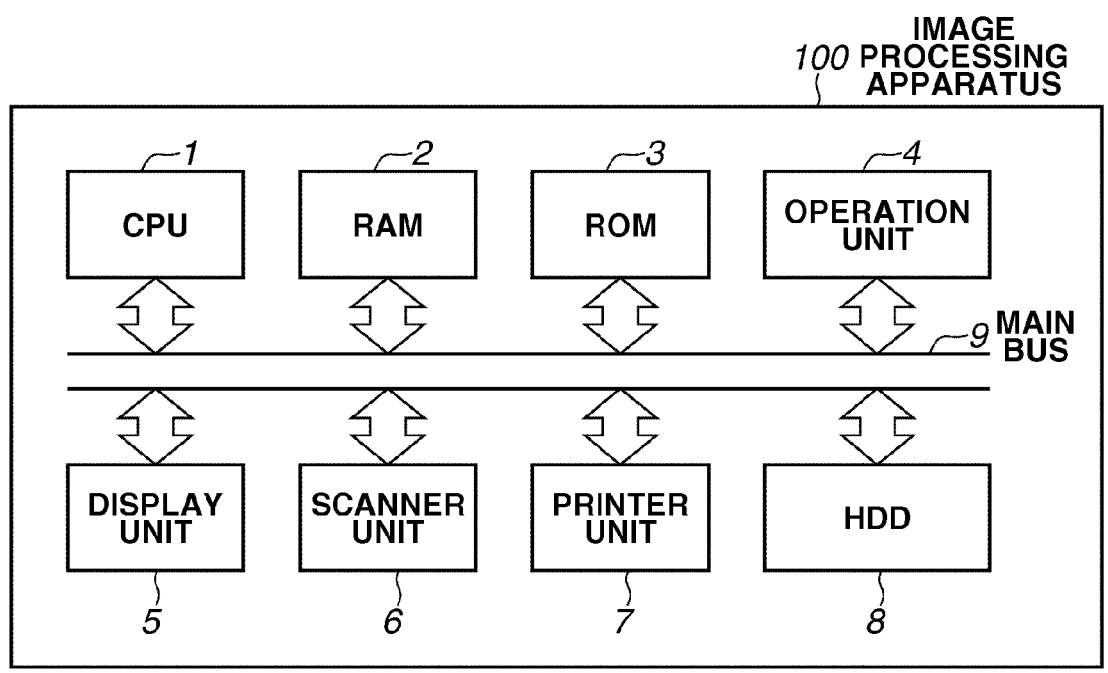
FIG. 1 illustrates a hardware configuration of an image processing apparatus according to an exemplary embodiment of the present invention.

FIG. 1 is a block diagram illustrating the configuration of an information processing apparatus 100 according to an exemplary embodiment of the present invention. The image processing apparatus 100 includes a central processing unit (CPU) 1, a read only memory (ROM) 2, a random access memory (RAM) 3, an operation unit 4, a display unit 5, a scanner unit 6, a printer unit 7, and a hard disk drive (HDD) 8 and these components are connected with one another via a main bus 9.

The CPU 1 integrally executes control over the image processing apparatus 100 according to a program stored in the ROM 3. The RAM 2 is composed of a static random access memory (SRAM) or a dynamic random access memory (DRAM) and used to store variables or data necessary for the CPU 1 to execute a program. The RAM is mainly used as an operation buffer of the CPU 1.

The ROM 3 stores software or various programs executed by the CPU 1. For example, the ROM 3 stores a printing program that causes a printer unit 305 to perform printing processing, and a display control program that causes an operation unit 307 to display a screen. The operation unit 4 includes a keyboard and a pointing device and accepts various operations from a user.

The display unit 5 includes a liquid crystal display (LCD) and a light emitting diode (LED), and displays a screen according to an instruction from the CPU 1. The scanner unit 6 scans a document according to an instruction from the CPU 1 and converts the document data into image data. The printer unit 7 is configured to record the image data on recording paper.

The HDD 8 stores an image read by the scanner unit 6 or data received from an external unit via a communication unit (not illustrated). Further, the HDD 8 stores an application program executed by the CPU 1.

FIG. 2 illustrates a decryption key form table stored in the HDD 8 of the image processing apparatus 100. The decryption key form table stores an encryption system, a decryption key form as identification information for identifying a type of a decryption key necessary to decrypt a file encrypted with the encryption system, a decryption key input method, and the like.

For example, in a case of a symmetric key encryption system, "password" is stored as the decryption key form. Further, "enter character" is set as the decryption key input method. In addition, upon entering characters, the entered characters are replaced and hidden by a character like "*" or "●" as the decryption key input method.

On the other hand, in a case of an asymmetric key encryption system, "secret key file" is stored as the decryption key form. Further, "designate file" is stored as the decryption key input method. In the case of a file whose decryption key form is "secret key file", information about an extension of the file may be stored in association with the decryption key form or the decryption key input method.

For example, in the case of the asymmetric key encryption system, an extension, "p12", of a secret key file is stored in association with the decryption key form. Then, it can be set as the decryption key input method to accept only secret key files having an extension of p12 when a user designates a file.

Here, information about each encryption system stored in the decryption key form table may be set in advance or a new encryption system may be registered in response to a user's instruction.

Figure 3:
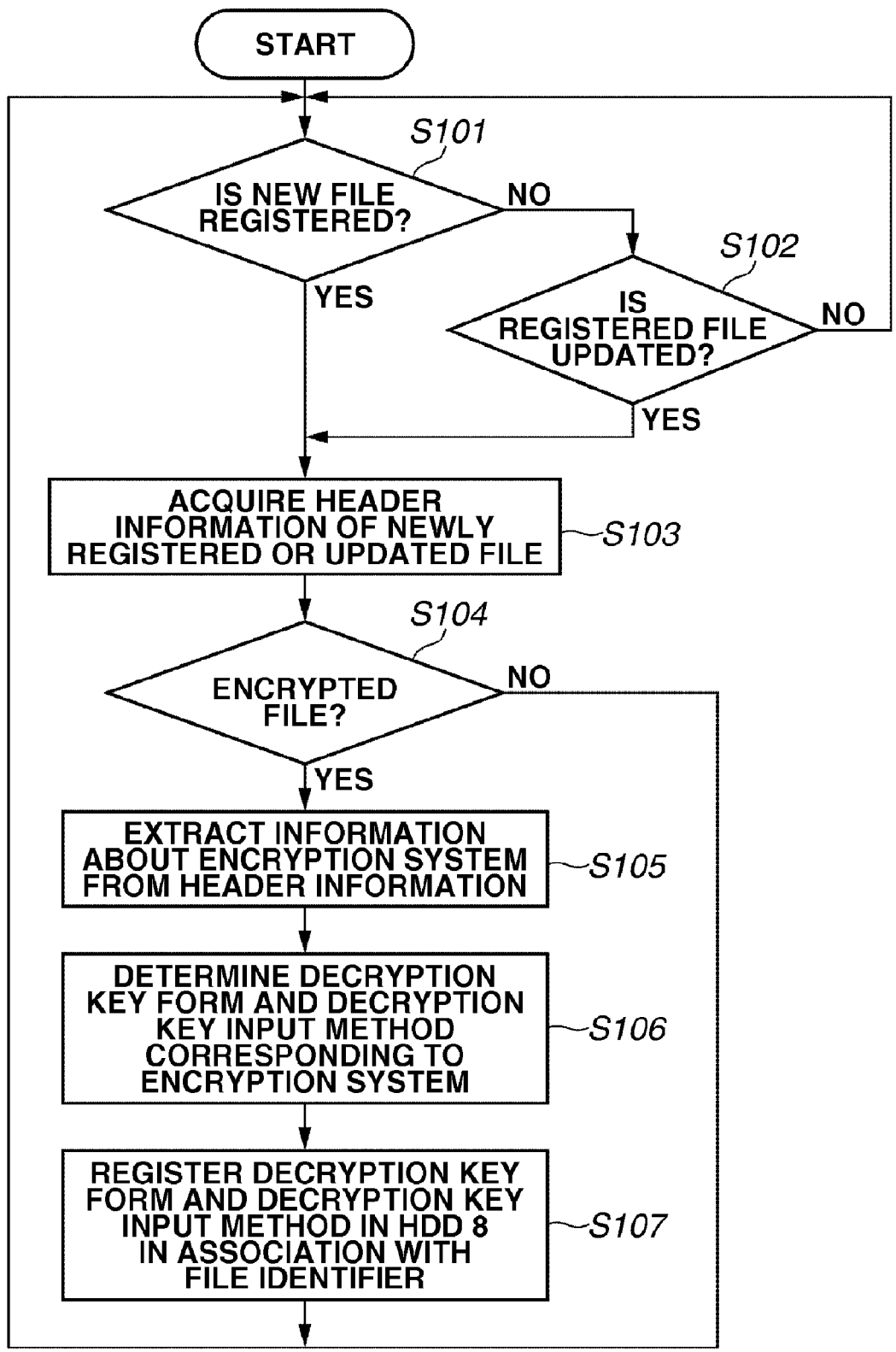
FIG. 3 is a flowchart illustrating an example of a control procedure according to an exemplary embodiment of the present invention.

Referring to a flowchart illustrated in FIG. 3, processing for registering a file is described. First, in step S101, the CPU 1 determines whether a new file is registered in the HDD 8. If it is determined that the new file is added (YES in step S101), the CPU 1 advances the processing to step S103. On the other hand, if the new file is not added (NO in step S101), the CPU 1 advances the processing to step S102.

In step S102, the CPU 1 determines whether the file registered in the HDD 8 is updated. For example, the CPU 1 determines that the file is updated if a format of the file registered in the HDD 8 is converted or encrypted or the file name is changed. If it is determined that the file is updated (YES in step S102), the CPU 1 advances the processing to step S103. On the other hand, if the file is not updated (NO in step S102), the CPU 1 returns the processing to step S101.

In step S103, the CPU 1 acquires header information of the file newly registered in the HDD 8 in step S101 or the file updated in step S102.

Next, in step S104, the CPU 1 determines whether the updated file is an encrypted file based on the header information acquired in step S103. If it is determined that the file is not encrypted (NO in step S104), the CPU 1 returns the processing to step S101. On the other hand, if it is determined that the file is encrypted (YES in step S104), the CPU 1 advances the processing to step S105.

In step S105, the CPU 1 extracts information about an encryption system from the header information acquired in step S103. Then, in step S106, the CPU 1 references the decryption key form table illustrated in FIG. 2 to determine the decryption key form and decryption key input method corresponding to the encryption system. For example, if a file is encrypted based on the symmetric key encryption system, the CPU 1 determines that the decryption key form is "password" and the decryption key input method is to "enter character" with respect to the file.

Then, in step S107, the CPU 1 stores the determined decryption key form and decryption key input method in a storage information table illustrated in FIG. 6 in association with a file identifier of a target file (combination of a file name and file extension).

For example, when a new file expressed by a file identifier "AAAAA.pdf" illustrated in FIG. 4 is stored in the HDD 8, the CPU 1 performs following control. The CPU 1 stores the decryption key form, "password", and the decryption key input method, "designate file, only extension p12", in the storage information table illustrated in FIG. 6 in association with the file identifier "AAAAA.pdf" of the new file.

Figure 5B:
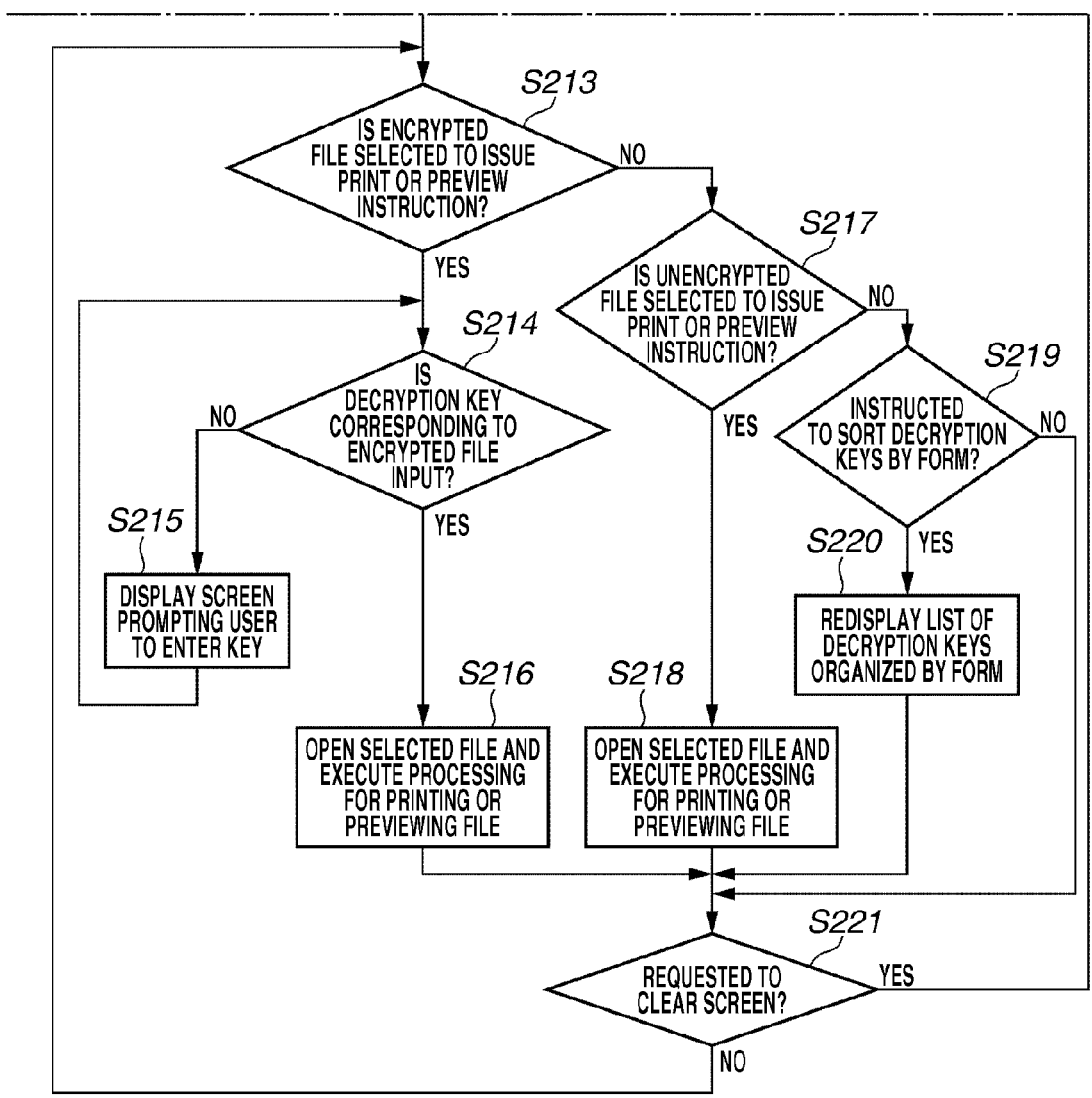

Referring to a flowchart illustrated in FIGS. 5A and 5B, processing for using a file is described. First, in step S201, the CPU 1 determines whether a file list display request is issued by the operation unit 4. If it is determined that the file list display request is not issued (NO in step S201), the CPU 1 repeats the processing in step S201. If it is determined that the file list display request is issued (YES in step S201), the CPU 1 advances the processing to step S202.

In step S202, the CPU 1 acquires information about the requested file from the storage information table illustrated in FIG. 6. For example, if a user designates a folder via the operation unit 4 and issues a display request, the CPU 1 acquires information about all files in the folder from the HDD 8.

Then, the CPU 1 performs processing described in steps S203 to S212, on each of the files to which a request for display is made.

First, in step S203, the CPU 1 determines whether information about a file specified by a file identifier is stored in the storage information table. If the information is not stored (NO in step S203), the CPU 1 advances the processing to step S211 to display only the file identifier on the display unit 5.

On the other hand, if it is determined that the information about the file specified by the file identifier is stored (YES in step S203), the CPU 1 advances the processing to step S204.

Next, in step S204, the CPU 1 determines whether information about a form of a decryption key for the file specified by the file identifier is stored in the storage information table. If information about the form of the decryption key is not stored (NO in step S204), the CPU 1 advances the processing to step S211. In step S211, the CPU 1 displays only the file identifier on the display unit 5.

On the other hand, if the information about the form of the decryption key is stored (YES in step S204), the CPU 1 advances the processing to step S205 to determine the form of the decryption key corresponding to the file specified by the file identifier.

In step S205, if it is determined that the decryption key form is a policy account (POLICY in step S205), the CPU 1 advances the processing to step S206 in which the CPU 1 determines an input form of a decryption key input portion corresponding to the policy account based on the decryption key form table illustrated in FIG. 2. More specifically, in step S206, the CPU 1 determines an input portion for inputting policy account in which entered characters are not hidden and an input portion for inputting a password in which entered characters are hidden as the decryption key input form corresponding to the file identifier.

On the other hand, in step S205, if it is determined that the decryption key form is "password" (PASSWORD in step S205), the CPU 1 advances the processing to step S207 and determines the input portion for inputting password in which entered characters are hidden as the decryption key input form corresponding to the file identifier.

In step S205, if it is determined that the decryption key form is "asymmetric key" (ASYMMETRIC KEY in step S205), the CPU 1 advances the processing to step S208 and determines a file selection portion for designating a secret key file as an input form of the decryption key input portion corresponding to the file identifier.

At this time, the CPU 1 may perform control to set only files having an extension (p12 etc.) indicating the secret key file to be selectable in the file selection portion with reference to the decryption key form table.

Further, in step S205, if it is determined that the decryption key form is the ADC system that performs authentication by combination of an e-mail address and a password (ADC in step S205), the CPU 1 advances the processing to step S209 and determines the input portion as the input form of the decryption key input portion as follows. The CPU 1 determines a character input portion suitable for inputting an e-mail address and the input portion for inputting the password in which the entered characters are hidden as the input form of the decryption key input portion corresponding to the file identifier.

The CPU 1 determines the input form by the processing in any one of steps S206 to S209 and then in step S210, displays the file identifier, the decryption key form, and the decryption key input portion on the display unit 5 in association with one another.

Next, in step S212, the CPU 1 determines whether all requested files are displayed. If it is determined that all requested files are not displayed (NO in step S212), the CPU 1 returns the processing to step S203 and repeats the processing in steps S203 to S212 until all requested files are displayed. When all file identifiers are processed, the CPU 1 causes the display unit 5 to display a display screen illustrated in FIG. 7.

In this way, the CPU 1 displays the file identifiers, its decryption key forms and the decryption key input portions of the plurality of files in association with one another in the list form. As a result, a user can easily recognize the corresponding decryption key form and input method on a file basis. On the display screen according to the present exemplary embodiment, the file identifiers are sorted by file names and file types and displayed, but the present invention is not limited thereto. The file identifier itself may be displayed.

Next, in step S213, the CPU 1 determines whether any encrypted file is selected by the operation unit 4 and instructed to be printed or previewed.

If it is determined that an instruction to print or preview the selected encrypted file is input (YES in step S213), the CPU 1 advances the processing to step S214 and determines whether the decryption key based on the decryption key input method corresponding to the encrypted file is input by the operation unit 4. If the decryption key is not input (NO in step S214), then in step S215, the CPU 1 displays a message that prompts a user to enter the decryption key on the display unit 5 and returns the processing to step S214.

If it is determined that a correct decryption key is input (YES in step S214), the CPU 1 advances the processing to step S216 and activates an application corresponding to the selected file to send a print or preview instruction and the input decryption key to the application. Then, the CPU 1 advances the processing to step S221.

On the other hand, if it is determined that the encrypted file is not selected in step S213 (NO in step S213), the CPU 1 advances the processing to step S217. In step S217, the CPU 1 determines whether an unencrypted file is selected and an instructed to print or preview the unencrypted file is issued. If the unencrypted file is selected and the instruction to print or preview the unencrypted file is issued(YES in step S217), the CPU 1 advances the processing to step S218.

In step S218, the CPU 1 activates an application corresponding to the selected file and sends a print or preview instruction to the application. Then, the CPU 1 advances the processing to step S221.

On the other hand, if it is determined that the unencrypted file is not selected in step S217 (NO in step S217), the CPU 1 advances the processing to step S219. In step S219, the CPU 1 determines whether an instruction to sort files by the decryption key form is sent. If it is determined that the instruction to sort the files is sent (YES in step S219), in step S220, the CPU 1 displays the information about the plurality of files which is displayed in the form illustrated in FIG. 7 on the display unit 5 as a list which is sorted by the decryption key form as illustrated in FIG. 8. Then, the CPU 1 advances the processing to step S221.

Then, in step S221, the CPU 1 determines whether the operation unit 4 has accepted a request to clear a list display screen illustrated in FIG. 7 or 8. If the request to clear the screen is not accepted (NO in step S221), the CPU 1 returns the processing to step S213. If the request to clear the screen is accepted (YES in step S221), the CPU 1 returns the processing to step S201.

Referring to FIG. 9, an operation performed by an application is described. First, if a user issues an instruction to activate the application, the CPU 1 starts the processing illustrated in FIG. 9. The processing illustrated in the flowchart in FIG. 9 is started by the CPU 1 reading a program stored in the ROM 3.

When receiving a start instruction, the CPU 1 first determines whether the start instruction is issued via the display screen illustrated in FIG. 7 or 8 in step S301. If the start instruction is issued not via the display screen illustrated in FIG. 7 or 8 but by designating an application software name or clicking on an icon that sets up a link to the application software (NO in step S301), the CPU 1 advances the processing to step S306. In step S306, the CPU 1 performs general start processing.

In this case, after the CPU 1 completes the general start processing, the user sends an instruction to designate and open a file using the activated application. Then, the CPU 1 advances the processing to step S311. In step S311, if the user's instruction is accepted (YES in step S311), the CPU 1 advances the processing to step S312 and performs the processing according to the accepted instruction.

On the other hand, if it is determined that the start instruction is issued via the display screen illustrated in FIG. 7 or 8 in step S301 (YES in step S301), the CPU 1 advances the processing to step S302. In step S302, the CPU 1 determines whether the decryption key corresponding to the encrypted file is received. If the decryption key is received via the processing in step S216 illustrated in FIG. 5B (YES in step S302), the CPU 1 advances the processing to step S303.

On the other hand, if it is determined that the decryption key is not received via the processing in step S216 illustrated in FIG. 5B (NO in step S302), the CPU 1 advances the processing to step S307. In step S307, the CPU 1 performs start processing for the selected files that are determined in step S217. Here, if a print instruction for the file is issued, the CPU 1 prints the file by the printer unit 7. If a preview instruction is issued, the CPU 1 previews file contents on the display unit 5.

In step S303, the CPU 1 decrypts the encrypted file using the received decryption key to allow the user to use the file. Then, in step S304, if it is determined that the print instruction for the file is issued (YES in step S304), the CPU 1 prints the file by the printer unit 7 in step S305.

If it is determined that the print instruction is not issued in step S304 (NO in step S304), the CPU 1 advances the processing to step S308. If it is determined that a preview instruction is issued (YES in step S308), the CPU 1 previews the file on the display unit 5 in step S309. On the other hand, in step S308, if it is determined that the preview instruction is not issued (NO in step S308), the CPU 1 performs processing in response to another instruction in step S310.

According to the present exemplary embodiment, as described above, the information about the plurality of files stored in the HDD 8 and the corresponding decryption key are displayed on the display unit in association with each other. Accordingly, the user can easily determine the form of the decryption key necessary to decrypt the encrypted file.

Further, the input portion for inputting the decryption key having the form corresponding to each file is provided on the file display screen. After the decryption key was input into the input portion, the application is activated and the decryption key is sent to the activated application. Thus, the user can easily enter the decryption key suitable for each file. Moreover, the user can open the encrypted file only by selecting a desired file on the file list screen and entering the decryption key without activating the application corresponding to the desired file.

The present exemplary embodiment describes the image processing apparatus 100 as an example but is applicable to a computer and other such image processing apparatuses.

Second Exemplary Embodiment

The first exemplary embodiment describes the method for displaying the decryption key input portions in the list form for each encrypted file as illustrated in FIG. 7. A second exemplary embodiment of the present invention describes another example in which the input portion of the decryption key corresponding to the encryption system is displayed on the display unit 5 in response to the file encrypted with the encryption system is selected.

Descriptions of the first exemplary embodiment with reference to FIGS. 1 to 3 are applicable to the second exemplary embodiment and thus omitted.

Figure 10B:
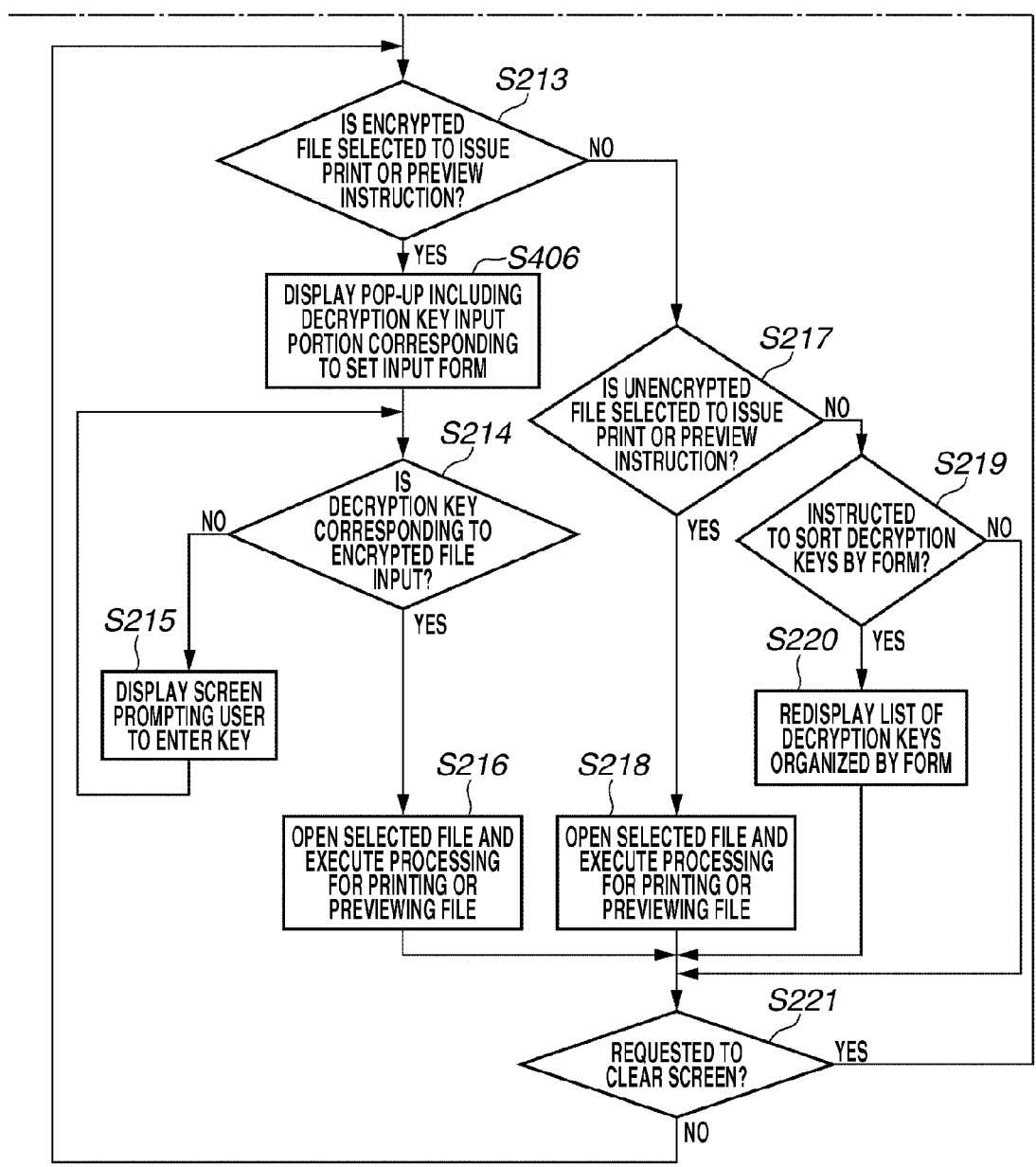

FIGS. 10A and 10B are a flowchart illustrating processing for using a file according to the second exemplary embodiment of the present invention. A program for performing the processing is stored in the ROM 3, and read and executed by the CPU 1. Steps similar to those in the flowchart illustrated in FIGS. 5A and 5B are denoted by identical reference numerals and thus not described.

The CPU 1 determines the decryption key form of the file to be displayed in step S205 when the files in the list form are displayed. If the decryption key form is "policy account" (POLICY in step S205), the CPU 1 determines the input form of the input portion of the decryption key corresponding to the policy account based on the decryption key form table illustrated in FIG. 2.

To be more specific, in step S401, the CPU 1 determines an input portion for inputting policy account in which entered characters are not hidden and an input portion for inputting a password in which entered characters are hidden as the decryption key form for the file to be displayed.

On the other hand, if it is determined that the decryption key form is "password" (PASSWORD in step S205), in step S402, the CPU 1 determines an input portion for inputting password in which entered characters are hidden as the decryption key form for the file to be displayed.

If it is determined that the decryption key form is "asymmetric key" (ASYMMETRIC KEY in step S205), in step S403, the CPU 1 determines a file selection portion for designating a secret key file as the decryption key form for the file to be displayed.

Further, if it is determined that the decryption key form is the ADC system (ADC in step S205), in step S404, the CPU 1 determines a character input portion suitable for inputting an e-mail address and an input portion for inputting password in which entered characters are hidden as the input form of the decryption key input portion corresponding to the file identifier.

After processing in any one of steps S401 to S404, in step S405, the CPU 1 displays the file identifier and the decryption key form on the display unit 5 in association with each other.

Next, in step S212, the CPU 1 determines whether all requested files are displayed. If it is determined that all requested files are not displayed (NO in step S212), the CPU 1 returns the processing to step S203 and repeats the processing in steps S203 to S212 until all requested files are displayed. When all file identifiers are processed, the CPU 1 causes the display unit 5 to display a display screen illustrated in FIG. 11.

In this way, the CPU 1 displays file identifiers and its decryption key form of the plurality of files in association with each other in the list form. As a result, a user can easily recognize the corresponding decryption key input form on a file basis. On the display screen according to the present exemplary embodiment, the file identifiers are sorted by the file names and the file types and displayed, but the present invention is not limited thereto. The file identifier itself may be displayed.

Next, in step S213, the CPU 1 determines whether any encrypted file is selected by the operation unit 4 and an instruction is issued to print or preview the encrypted file.

If it is determined that an instruction to print or preview the selected encrypted file is input, the CPU 1 advances the processing to step S406. In step S406, the CPU 1 displays a pop-up including the decryption key input portion corresponding to the input form set in steps S401 to S404 on the display unit 5.

For example, if the decryption key form set in the file is "password", the CPU 1 displays a pop-up screen as illustrated in FIG. 12 on the display unit 5.

If the decryption key form set in the file is "policy account", the CPU 1 displays a pop-up screen as illustrated in FIG. 13 on the display unit 5.

If the decryption key form set in the file is "password" and "operation password", the CPU 1 displays a pop-up screen as illustrated in FIG. 14 on the display unit 5.

If the decryption key form set in the file is "ADC account", the CPU 1 displays a pop-up screen as illustrated in FIG. 15 on the display unit 5.

Figure 16:
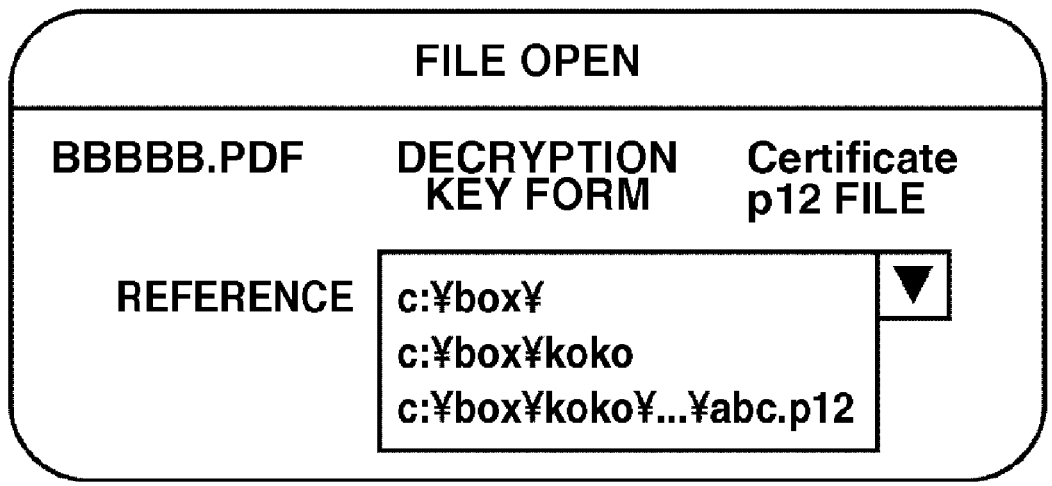
FIG. 16 illustrates an example of a display screen displayed on a display unit according to an exemplary embodiment of the present invention.

If the decryption key form set in the file is "secret key", the CPU 1 displays a pop-up screen as illustrated in FIG. 16 on the display unit 5.

When the decryption key is entered by a user on the pop-up screen as illustrated in FIGS. 12 to 16, the CPU 1 activates an application and passes the input decryption key to the application.

In step S220, the CPU 1 displays information about the plurality files displayed in the form illustrated in FIG. 11 on the display unit 5 as a list which is sorted by the decryption key form as illustrated in FIG. 17.

According to the above control, a user can recognize the decryption key form for decrypting the encrypted file and enter the decryption key on the file list display screen or the pop-up screen without starting the application.

The present exemplary embodiment describes the image processing apparatus 100 as an example but is applicable to a computer and other such image processing apparatuses. In addition, the image processing apparatus maybe an image forming apparatus or printing apparatus.

In the above exemplary embodiments, a PDF is described as a format example of the encrypted file. However, the present invention is not limited to the PDF file but is applicable to a file compatible with an opened document format (ODF), a file based on a specification of an open extensible markup language (OpenXML), and other such files. In this case, the image processing apparatus 100 can store a PDF-format file, an ODF-format file, or an OpenXML-format file. Moreover, the above exemplary embodiments are applicable to an environment where a plurality of formats are mixed in the HDD 8.

In the above exemplary embodiments, the image processing apparatus capable of storing an encrypted file is described by way of example. However, the present invention is not limited to the above described image processing apparatus but is applicable to, for example, an image processing apparatus capable of storing a plurality of files each of which has a plurality of types of authentication information to use the file.

In this case, the image processing apparatus stores identification information for identifying one of the plurality types of authentication information which is necessary to use each of the plurality of files stored in a memory unit. In addition, the plurality of files and the identification information stored in the image processing apparatus are displayed in association with each other. As a result, a user can easily recognize a type of authentication information necessary to use a desired file.

In this case, the plurality of files includes a file whose data is processed and a file whose data is not processed. Further, in the above exemplary embodiments, information representing the decryption key form can correspond to the identification information.

Further, when the authentication information for each file is displayed, if an authentication information input form (for example, finger print, iris, vein, identification (ID) card, key input, etc.) is displayed together, usability is further improved.

Referring to a memory map illustrated in FIG. 18, the configuration of a data processing program readable by the image processing apparatus according to the exemplary embodiments of the present invention is described below.

FIG. 18 illustrates the memory map of a storage medium which stores various data processing programs readable by the image processing apparatus according to the exemplary embodiments of the present invention.

Although not particularly illustrated, information for managing a program group stored in the storage medium, for example, version information and creator can also be stored, and information dependent on an operating system (OS) of an apparatus which reads a program, for example, an icon for identifying a program may be stored as well.

Moreover, data dependent on various programs is managed in the above mentioned directory. Further, if a program for installing various programs into a computer is compressed, a decompression program may be also stored.

The control procedures of the exemplary embodiments as illustrated in FIG. 3, FIGS. 5A and 5B, FIG. 9, and FIG. 10 may be performed by a host computer based on a program installed from an external device.

In this case, the present invention is applicable to a case where an information group including a program is supplied to an output device from a storage medium such as a compact disk read only memory (CD-ROM), a flash memory, or a floppy disk (FD) or an external storage medium via a network.

As described above, a computer-readable storage medium that records a program code of software that realizes the functions of the above exemplary embodiments is supplied to a system or an apparatus. A computer of the system or apparatus (or a CPU or a microprocessor unit (MPU)) can read and execute the program code stored in the storage medium.

In this case, the program code read from the storage medium realizes the functions of the above exemplary embodiments, and the storage medium storing the program code implements the present invention.

Accordingly, the computer program may be supplied in any form such as an object code, a program executed by an interpreter, or script data supplied to an operating system insofar as the computer program can realize a program function.

Various storage media can be used for supplying the program. Examples of the media include a floppy disk, a hard disk, an optical disk, a magneto-optical disk (MO), a compact disk-read only memory (CD-ROM), a CD-recordable (CD-R), a CD-rewritable (CD-RW), a magnetic tape, a nonvolatile memory card, a ROM, and a digital versatile disk (DVD).

In this case, the program code read from the storage medium realizes the functions of the above exemplary embodiments. The storage medium storing the program code implements the present invention.

In addition, the program can be supplied by accessing a web site on the Internet from a browser of a client computer and downloading the program from the web site to a recording medium such as a HDD. Moreover, the problem can be supplied by downloading a compressed file having an automatic installation function to the recording medium such as the HDD.

Further, the present invention can be achieved by dividing a program code that constitutes a program of the present invention into a plurality of files and downloading the files from different web sites. In other words, the scope of the present invention encompasses a world wide web (WWW) server or a file transfer protocol (ftp) server that allows a plurality of users to download the program file for implementing the functional processing of the exemplary embodiments of the present invention on a computer.

Furthermore, the program of the exemplary embodiments of the present invention may be distributed to a user after being encrypted and stored in a storage medium such as a CD-ROM. In this case, a user who meets a predetermined condition is permitted to download key information for decryption from a web site via the Internet so as to install the encrypted program in a computer-executable form based on the key information.

Further, the functions of the above exemplary embodiments is realized not only by executing a program code read by a computer. For example, the functions of the exemplary embodiments could be realized by executing a part or the whole of actual processing by an OS running on the computer based on an instruction of the program code.

Furthermore, a program code read from a storage medium may be written to a memory of a function extension board that is inserted into a computer or a function extension unit that is connected to the computer and then, control may be performed according to an instruction of the program code. For example, a CPU provided in the function extension board or the function extension unit performs a part or the whole of actual processing to realize the functions of the exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-230406 filed Sep. 5, 2007, which is hereby incorporated by reference herein in its entirety.

What is claimed is:

1. An information processing apparatus comprising:
a storage unit configured to store identification information to identify a type of authentication information which is necessary to use each of a plurality of files stored in a memory unit from among a plurality of types of authentication information; and
a display control unit configured to display the plurality of files stored in the memory unit, the identification information stored in the storage unit, and a plurality of input portions configured to input the authentication information corresponding to the identification information on a display unit in association with each other, wherein each of the plurality of input portions has an input form corresponding to the type of the authentication information.

2. The information processing apparatus according to claim 1, wherein the display control unit collectively displays the plurality of files sorted by the type of the authentication information on the display unit.

3. The information processing apparatus according to claim 1, wherein the plurality of files include any of a PDF-format file, an ODF-format file, or an OpenXML-format file.

4. The information processing apparatus according to claim 1, wherein the memory unit can store a plurality of files encrypted by different types of encryption systems, and the authentication information is a decryption key necessary to decrypt the file.

5. The information processing apparatus according to claim 1, wherein the display control unit displays the plurality of files and the identification information stored in the storage unit on the display unit in association with each other without executing an application program corresponding to each of the plurality of files stored in the memory unit.

6. A method for controlling an information processing apparatus, the method comprising:
storing identification information to identify a type of authentication information which is necessary to use each of a plurality of files stored in a memory unit from among a plurality of types of authentication information; and
causing a display unit to display the plurality of files stored in the memory unit, the stored identification information, and a plurality of input portions configured to input the authentication information corresponding to the identification information in association with each other, wherein each of the plurality of input portions has an input form corresponding to the type of the authentication information.

7. The method according to claim 6, further comprising:
causing the display unit to collectively display the plurality of files sorted by the type of the authentication information.

8. The method according to claim 6, wherein the plurality of files include any of a PDF-format file, an ODF-format file, or an OpenXML-format file.

9. The method according to claim 6, wherein the memory unit can store a plurality of files encrypted by different types of encryption systems, and the authentication information is a decryption key necessary to decrypt the file.

10. The method according to claim 6, further comprising:
causing the display unit to display the plurality of files and the stored identification information in association with each other without executing an application program corresponding to each of the plurality of files stored in the memory unit.

11. A non-transitory computer-readable storage medium readable by a computer which stores a computer-executable program for controlling an information processing apparatus, the computer-executable program executing a method comprising:
storing identification information to identify a type of authentication information which is necessary to use each of a plurality of files stored in a memory unit from among a plurality of types of authentication information; and
causing a display unit to display the plurality of files stored in the memory unit, the stored identification information, and a plurality of input portions configured to input the authentication information corresponding to the identification information in association with each other, wherein each of the plurality of input portions has an input form corresponding to the type of the authentication information.

12. An information processing apparatus comprising:
a determining unit configured to determine a type of authentication information which is necessary to use each of a plurality of files stored in a memory unit; and
a display control unit configured to display the plurality of files stored in the memory unit, identification information to identify the type of the authentication information determined by the determining unit, and a plurality of input portions configured to input the authentication information corresponding to the identification information on a display unit in association with each other, wherein each of the plurality of input portions has an input form corresponding to the type of the authentication information.

13. A non-transitory computer-readable storage medium readable by a computer which stores a computer-executable program for controlling an information processing apparatus, the computer-executable program executing a method comprising:

determining a type of authentication information which is necessary to use each of a plurality of files stored in a memory unit; and causing a display unit to display the plurality of files stored in the memory unit, identification information to identify the determined type of the authentication information, and a plurality of input portions configured to input the authentication information corresponding to the identification information in association with each other, wherein each of the plurality of input portions has an input form corresponding to the type of the authentication information.

* * * * *